United States Patent
Shiba

(10) Patent No.: US 6,536,293 B2
(45) Date of Patent: Mar. 25, 2003

(54) ROTATIONAL ANGLE DETECTING APPARATUS, TORQUE SENSOR AND STEERING APPARATUS

(75) Inventor: Mahito Shiba, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/966,089

(22) Filed: Oct. 1, 2001

(65) Prior Publication Data

US 2002/0039025 A1 Apr. 4, 2002

(30) Foreign Application Priority Data

Oct. 2, 2000 (JP) ........................................ 2000-302742

(51) Int. Cl.[7] ................................................. G01L 3/02
(52) U.S. Cl. .................................................. 73/862.193
(58) Field of Search ........................ 73/862.08, 862.27, 73/862.331, 862.333, 862.335, 862.193

(56) References Cited

U.S. PATENT DOCUMENTS

| | | | |
|---|---|---|---|
| 4,751,978 A | * 6/1988 | Drutchas et al. | 180/446 |
| 4,821,604 A | * 4/1989 | Asano | 180/248 |
| 5,032,996 A | * 7/1991 | Shiraishi | 180/400 |
| 5,065,324 A | * 11/1991 | Oshita et al. | 180/400 |
| 5,563,790 A | * 10/1996 | Wada et al. | 180/446 |
| 6,330,522 B1 | * 12/2001 | Takeuchi | 180/400 |
| 6,386,052 B1 | * 5/2002 | Satoh et al. | 73/1.09 |

FOREIGN PATENT DOCUMENTS

| | | |
|---|---|---|
| JP | A 2000-352502 | 12/2000 |
| JP | A 2001-133338 | 5/2001 |
| WO | 00/62031 | 10/2000 |

* cited by examiner

*Primary Examiner*—Max Noori
(74) *Attorney, Agent, or Firm*—Birch, Stewart, Kolasch & Birch, LLP

(57) ABSTRACT

A rotational angle detecting apparatus includes targets provided on a rotor to output a signal which repeats periodical increase and decrease in accordance with rotation of the rotor; a first detector for detecting an adjacent part of a target; and a second detector for detecting a part, which is a predetermined angle distant in a circumferential direction of the rotor from the part detected by the first detector, detects the rotational angle of the rotor based on the detected signal outputted from one of the detectors. The memory stores, corresponding to a detected signal value which should be outputted from selected one of the detectors, a detected signal value which should be synchronously outputted from the other detector. Malfunction can be detected by judging whether the detected signal value which is stored in the memory is approximately the same as the detected signal outputted actually.

12 Claims, 10 Drawing Sheets

ROTATIONAL ANGLE DETECTING APPARATUS, TORQUE SENSOR AND STEERING APPARATUS

BACKGROUND OF THE INVENTION

1. Field of the Invention

The present invention relates to a rotational angle detecting apparatus for detecting an rotational angle of a rotor, a torque sensor using the rotational angle detecting apparatus, and a steering apparatus for generating steering assistance force by driving an electric motor based on the result of the detection of the torque sensor.

2. Description of Related Art

Some steering apparatus for automobiles assist steering by driving electric motors thereof, so as to lighten drivers' load. A steering apparatus comprises an input shaft connected to a steering wheel, an output shaft connected to wheels for steering through a pinion and a rack, for example, and a torsion bar which connects the input shaft and the output shaft. A steering torque applied to the input shaft is detected as torsion generated on the torsion bar by a torque sensor. An electric motor for steering assistance, which interlocks with the output shaft, is driven and controlled based on the detected steering torque.

In an essential structure example of a rotational angle detecting apparatus and a torque sensor based on Patent Application Laid-Open No.2000-352502 proposed by the present applicant, a steering shaft is connected to a steering wheel 4 at an upper end thereof and to a torsion bar 5 at a lower end thereof as shown in FIG. 1. An upper shaft 23 of the steering shaft has a plurality of (FIG. 1 shows ten) protruding objects 7, 7 . . . made of magnetic material, with a predetermined tilt angle and along a circumferential surface of an intermediate portion 6 thereof. When the upper shaft 23 rotates, the protruding object 7 moves in an axial direction of the upper shaft 23. For detecting an adjacent part of the protruding object 7 moving in an axial direction of the upper shaft 23, a MR sensor 1 (a magneto-resistance effect element) is fixed to an immovable portion of the automobile body, having an appropriate space with and being parallel to the intermediate portion 6.

A lower shaft 18 of the steering shaft is connected to the torsion bar 5 at an upper end thereof and to a pinion 10 at a lower end thereof. The lower shaft 18, similarly with the upper shaft 23, has a plurality of (FIG. 1 shows ten) protruding objects 9, 9 . . . made of magnetic material, with a predetermined tilt angle and along a circumferential surface of an intermediate portion 8 thereof. When the lower shaft 18 rotates, the protruding object 9 moves in an axial direction of the lower shaft 18. For detecting an adjacent part of the protruding object 9 moving in an axial direction of the lower shaft 18, a MR sensor 2 (a magneto-resistance effect element) is fixed to an immovable portion of the automobile body, having an appropriate space with and being parallel to the intermediate portion 8.

The MR sensor 1 has sensors 1A and 1B, which have 180° different electrical angles, at the interior thereof. Detected signals V1A and V1B indicating the part of the protruding object 7, which are detected by the sensors 1A and 1B, are respectively given to a signal processing unit 11. The signal processing unit 11 detects a rotational angle of the upper shaft 23 based on the detected signals V1A and V1B. A rotational angle detecting apparatus of the upper shaft 23 is thus constructed from the sensors 1A, 1B and the signal processing unit 11.

The MR sensor 2 has sensors 2A and 2B, which have 180° different electrical angles, at the interior thereof. Detected signals V2A and V2B indicating the part of the protruding object 9, which are detected by the sensors 2A and 2B, are respectively given to a signal processing unit 11. The signal processing unit 11 detects a rotational angle of the lower shaft 18 based on the detected signals V2A and V2B. A rotational angle detecting apparatus of the lower shaft 18 is thus constructed from the sensors 2A, 2B and the signal processing unit 11.

The MR sensors 1 and 2 are provided in a condition where the detected signals V1A and V2A (output of sensor) are at the same phase and the detected signals V1B and V2B (output of sensor) are at the same phase as shown in FIG. 3 when no steering torque is applied to the steering wheel 4 and the torsion bar 5 is not twisted.

A torsion angle of the torsion bar 5 is several degrees at the utmost. The signal processing unit 11 calculates a steering torque based on difference between the rotational angle of the upper shaft 23 obtained from a detected signal V1A or V1B and the rotational angle of the lower shaft 18 obtained from a detected signal V2A or V2B, and outputs a torque signal.

In a torque sensor constructed as described above, every 36° the upper shaft 23 and the lower shaft 18 rotate, each part of the protruding object 7 and the protruding object 9 where is most adjacent to each detecting surface of the sensors 1A, 1B and the sensors 2A, 2B makes a return trip in axial direction of the upper shaft 23 and the lower shaft 18. The position in axial direction of the upper shaft 23 and the lower shaft 18 of each part of the protruding object 7 and the protruding object 9 where is most adjacent to each detecting surface of the sensors 1A, 1B and the sensors 2A, 2B corresponds to the rotational angle of the upper shaft 23 and the lower shaft 18.

In practice, the above-mentioned program for calculating each rotational angle of the upper shaft 23 and the lower shaft 18 is omitted. When a steering torque is applied to the steering wheel 4 and the torsion bar 5 is twisted, voltage difference ΔV corresponding to the torsion angle arises between each detected signal of sensors 1A and 2A, and each detected signal of sensors 1B and 2B. The torsion angle is obtained by calculating the voltage difference ΔV at the signal processing unit 11. The signal processing unit 11 outputs the torque signal expressing the steering torque.

However the above-mentioned rotational angle detecting apparatus and the torque sensor do not have means for detecting malfunction of the sensors 1A, 1B, 2A, and 2B when malfunction occurs. Consequently when the rotational angle detecting apparatus and the torque sensor fail, a torque is calculated based on erroneous detected signals, and an erroneous torque signal is outputted.

BRIEF SUMMARY OF THE INVENTION

The present invention has been made with the aim of solving the above problem.

It is an object of the invention to provide a rotational angle detecting apparatus which can detect malfunction.

Another object of the invention is to provide a torque sensor comprising the rotational angle detecting apparatus.

A further object of the present invention is to provide a steering apparatus comprising the torque sensor.

In a rotational angle detecting apparatus according to the first invention, one or a plurality of targets are arranged on a rotor, to output signals which repeat periodical increase and decrease in accordance with rotation of the rotor. First detecting means detects an adjacent part of the target. Second detecting means detects a part, which is a predetermined angle distant in a circumferential direction of the rotor from the part detected by the first detecting means. The rotational angle of the rotor is detected based on a detected signal which is outputted from the first detecting means or the second detecting means. A memory stores pairs of detected signal values which the first detecting means and the second detecting means should output synchronously. Judging means judges whether a pair of detected signal values, which is approximately the same as a pair of detected signal values outputted from the first detecting means and the second detecting means synchronously, is included in the pairs of detected signal values stored in the memory. When the judging means judges in the negative, a malfunction indicating signal is outputted.

Consequently the above-mentioned rotational angle detecting apparatus can detect malfunction, and more particularly, can detect the malfunction thereof even when the broken rotational angle detecting apparatus outputs a detected signal which is within a range.

In a rotational angle detecting apparatus according to the second invention, one or a plurality of targets are arranged on a rotor, to output signals which repeat periodical increase and decrease in accordance with rotation of the rotor. First detecting means detects an adjacent part of the target. Second detecting means detects a part, which is a predetermined angle distant in a circumferential direction of the rotor from the part detected by the first detecting means. The rotational angle of the rotor is detected based on a detected signal which is outputted from the first detecting means or the second detecting means. Selecting means selects the first detecting means or the second detecting means for detecting the rotational angle of the rotor. A memory stores, corresponding to a detected signal value which should be outputted from one of the detecting means which is selected by the selecting means, a detected signal value which should be synchronously outputted from the other detecting means. Judging means judges whether the detected signal value of the other detecting means, which the memory stores corresponding to the detected signal value outputted from the one of the detecting means selected by the selecting means, is approximately the same as a detected signal value outputted from the other detecting means. When the judging means judges in the negative, a malfunction indicating signal is outputted.

Consequently the above-mentioned rotational angle detecting apparatus can detect malfunction, and more particularly, can detect the malfunction thereof even when the broken rotational angle detecting apparatus outputs a detected signal which is within a range.

A torque sensor according to the present invention comprises a rotational angle detecting apparatus according to the first invention or the second invention at an input shaft and an output shaft respectively, the input shaft and the output shaft being connected by a torsion bar. The torque sensor detects a torque applied to the input shaft based on rotational angle difference, which is generated by a torsion of the torsion bar, detected by the rotational angle detecting apparatus.

The above-mentioned torque sensor can detects malfunction of the rotational angle detecting apparatus.

In a steering apparatus according to the present invention, an input shaft is connected to a steering wheel and an electric motor for steering assistance is driven and controlled based on a steering torque applied to the steering wheel. An output shaft interlocks with the electric motor, a torsion bar connects the input shaft and the output shaft, the torque sensor according to the present invention detects a steering torque applied to the input shaft, and steering is assisted based on a steering torque detected by the torque sensor.

The above-mentioned steering apparatus comprises the torque sensor which can detects malfunction of the rotational angle detecting apparatus.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

Embodiment 1

Figure 1:
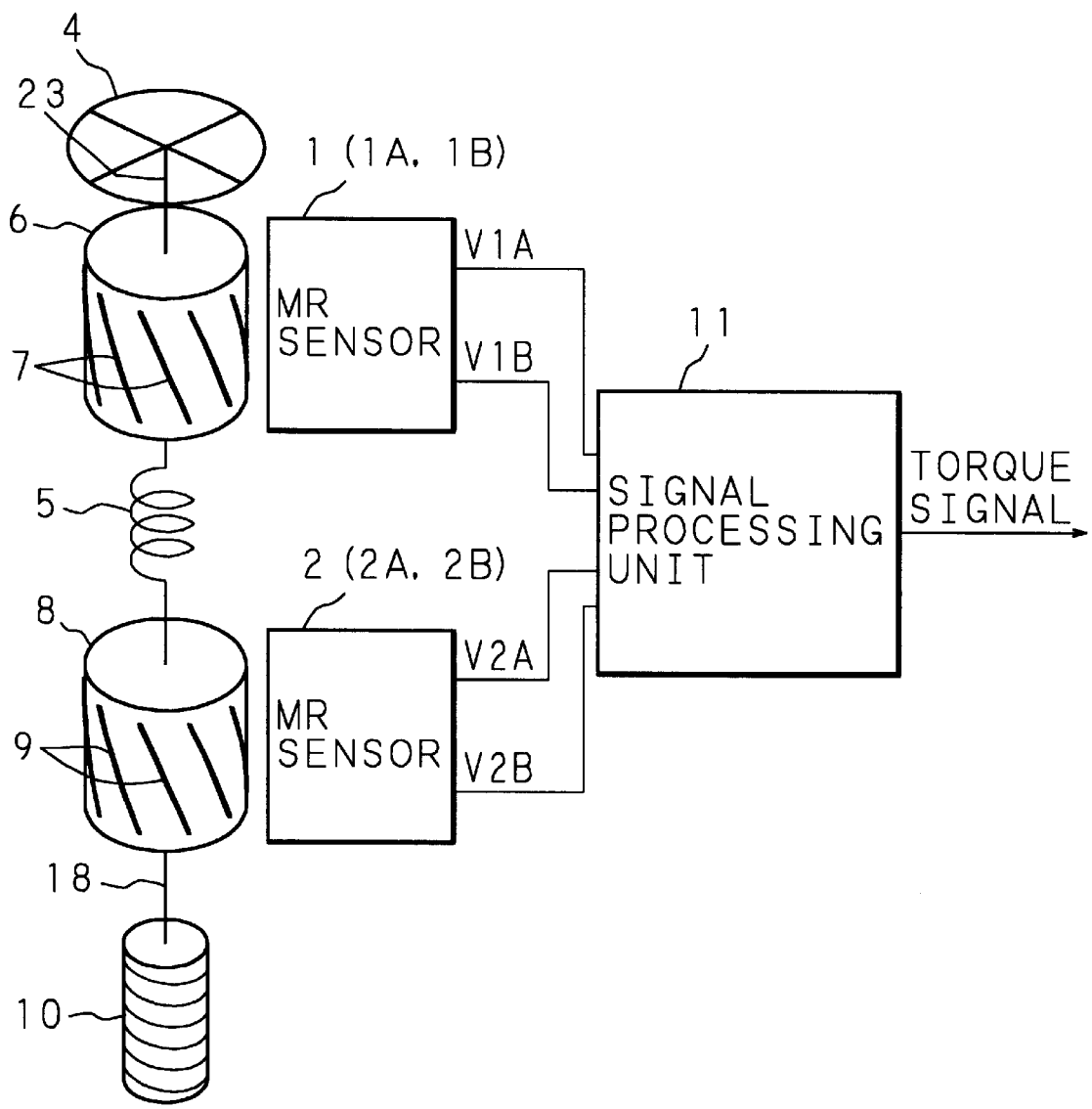
FIG. 1 is a schematic representation schematically showing an essential structure of a rotational angle detecting apparatus and a torque sensor of prior art.
Figure 2:
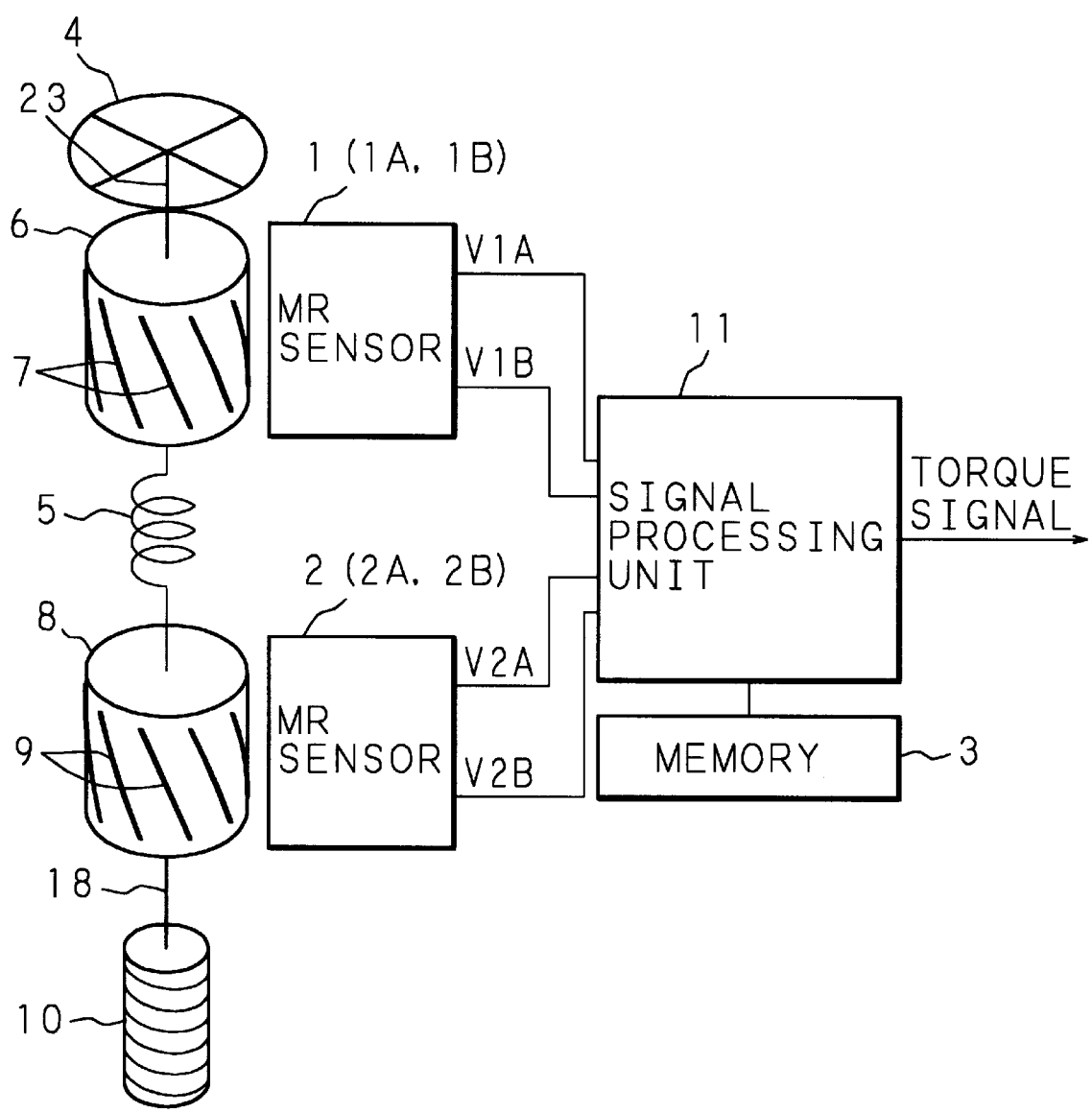
FIG. 2 is a schematic representation schematically showing an essential structure of an Embodiment of a rotational angle detecting apparatus and a torque sensor according to the present invention.

FIG. 2 is a schematic representation schematically showing an essential structure of an Embodiment of a rotational angle detecting apparatus and a torque sensor according to the present invention. The figure shows a torque sensor employed for a steering apparatus. The torque sensor has a plurality of (FIG. 2 shows ten) protruding objects 7, 7 . . . (targets) made of magnetic material, with a predetermined tilt angle and along a circumferential surface of an intermediate portion 6 (a rotor) of an upper shaft 23 (an input shaft) of a steering shaft which is connected to a steering wheel 4 at an upper end portion thereof and to a torsion bar 5 at a lower end portion thereof. When the upper shaft 23 rotates, the protruding object 7 moves in an axial direction of the upper shaft 23. For detecting an adjacent part of the protruding object 7 moving in an axial direction of the upper shaft 23, a MR sensor 1 (a magneto-resistance effect element) is fixed to an immovable portion of the automobile body, having an appropriate space with and being parallel to the intermediate portion 6.

A lower shaft 18 (an output shaft) of the steering shaft is connected to the torsion bar 5 at an upper end portion thereof and to a pinion 10 at a lower end portion thereof. The lower shaft 18, similarly with the upper shaft 23, has a plurality of (FIG. 2 shows ten) protruding objects 9, 9 . . . (targets) made of magnetic material, with a predetermined tilt angle and along a circumferential surface of an intermediate portion 8 (a rotor) thereof. When the lower shaft 18 rotates, the protruding object 9 moves in an axial direction of the lower shaft 18. For detecting an adjacent part of the protruding object 9 moving in an axial direction of the lower shaft 18, a MR sensor 2 (a magneto-resistance effect element) is fixed to an immovable portion of the automobile body, having an appropriate space with and being parallel to the intermediate portion 8.

The MR sensor 1 has sensors 1A and 1B, which have 180° different electrical angles, at the interior thereof. Detected signals V1A and V1B showing the part of the protruding object 7, which are detected by the sensors 1A and 1B, are respectively given to a signal processing unit 11. The signal processing unit 11 detects a rotational angle of the upper shaft 23 based on the detected signals V1A and V1B. A rotational angle detecting apparatus of the upper shaft 23 is thus constructed from the sensors 1A, 1B and the signal processing unit 11.

The MR sensor 2 has sensors 2A and 2B, which have 180° different electrical angles, at the interior thereof. Detected signals V2A and V2B showing the part of the protruding object 9, which are detected by the sensors 2A and 2B, are respectively given to a signal processing unit 11. The signal processing unit 11 detects a rotational angle of the lower shaft 18 based on the detected signals V2A and V2B. A rotational angle detecting apparatus of the lower shaft 18 is thus constructed from the sensors 2A, 2B and the signal processing unit 11.

Figure 3:
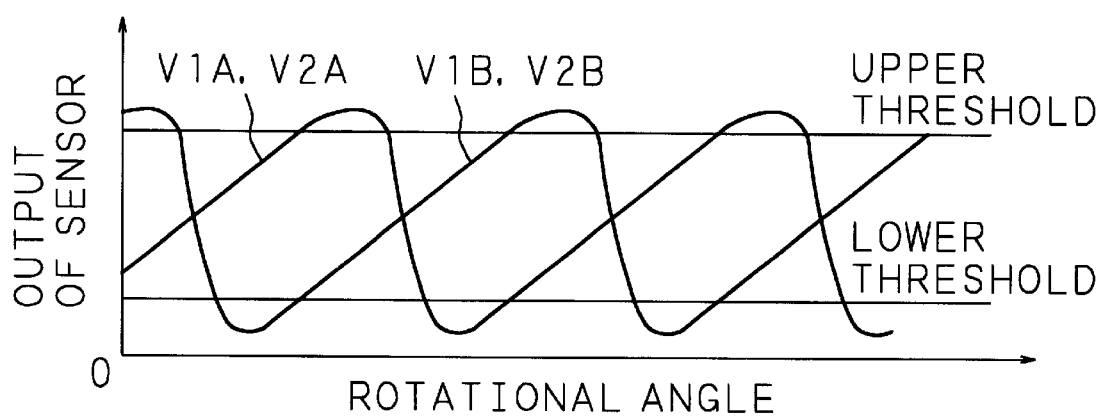
FIG. 3 is a wave form chart showing an example of wave forms of detected signals of MR sensors.

The MR sensors 1 and 2 are provided in a condition where the detected signals V1A and V2A (output of sensor) are at the same phase and the detected signals V1B and V2B (output of sensor) are at the same phase as shown in FIG. 3 when no steering torque is applied to the steering wheel 4 and the torsion bar 5 is not twisted.

A torsion angle of the torsion bar 5 is several degrees at the utmost. The signal processing unit 11 calculates a steering torque based on difference between the rotational angle of the upper shaft 23 obtained from a detected signal V1A or V1B and the rotational angle of the lower shaft 18 obtained from a detected signal V2A or V2B, and outputs a torque signal.

In a torque sensor constructed as described above, every 36° the upper shaft 23 and the lower shaft 18 rotate, each part of the protruding object 7 and the protruding object 9 where is most adjacent to each detecting surface of the sensors 1A, 1B and the sensors 2A, 2B makes a return trip in axial direction of the upper shaft 23 and the lower shaft 18. The position in axial direction of the upper shaft 23 and the lower shaft 18 of each part of the protruding object 7 and the protruding object 9 where is most adjacent to each detecting surface of the sensors 1A, 1B and the sensors 2A, 2B corresponds to the rotational angle of the upper shaft 23 and the lower shaft 18.

In practice, the above-mentioned program for calculating each rotational angle of the upper shaft 23 and the lower shaft 18 is omitted. When a steering torque is applied to the steering wheel 4 and the torsion bar 5 is twisted, voltage difference ΔV corresponding to the torsion angle arises between each detected signal of sensors 1A and 2A, and each detected signal of sensors 1B and 2B. The torsion angle is obtained by calculating the voltage difference ΔV at the signal processing unit 11. The signal processing unit 11 outputs the torque signal expressing the steering torque.

Regarding FIG. 3, an upper threshold and a lower threshold are set so that one of detected signals V1A and V1B and one of detected signals V2A and V2B are included in a linear domain within a range between the upper threshold and the lower threshold.

As shown in FIG. 3, the detected signals V1A and V1B (and also the detected signals V2A and V2B) generate the same wave form, electrical angles of which are 180° different from each other. Consequently, as shown in FIG. 4 in which the horizontal axis indicates the detected signal V1A and the vertical axis indicates the detected signal V1B, the detected signals V1A and V1B generate Lissajous' figure described with the continuous line in the figure while the electric angle undergoes a 360° transition.

Figure 4:
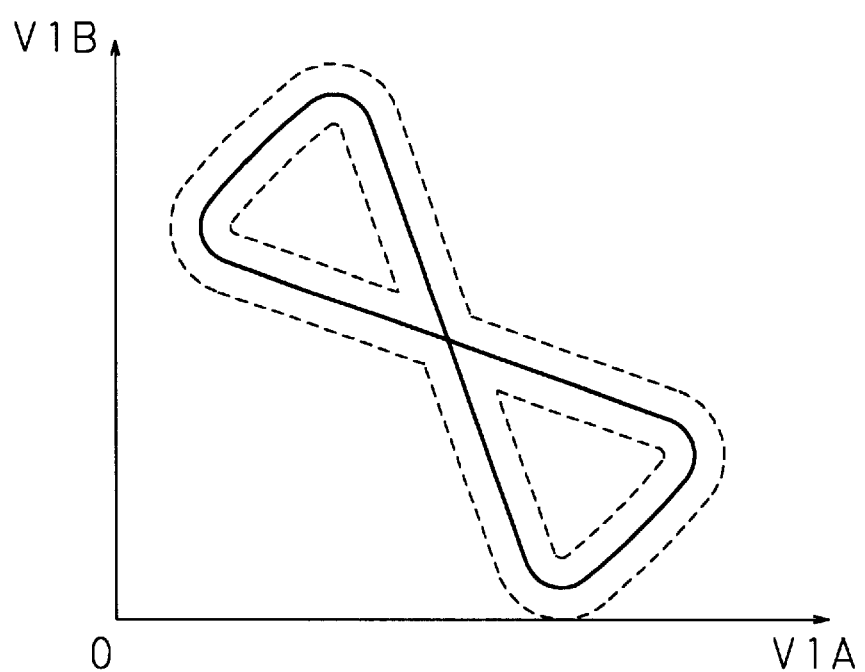
FIG. 4 is a graph for illustrating a correlation example of detected signals of MR sensors.

In the Lissajous' figure shown in FIG. 4, the detected signal V1A has two values for one value of the detected signal V1B, and the detected signal V1B has two values for one value of the detected signal V1A. Consequently, even when a value of one of the detected signals V1A and V1B is specified, a value of the other detected signal cannot be specified.

Figure 5A:
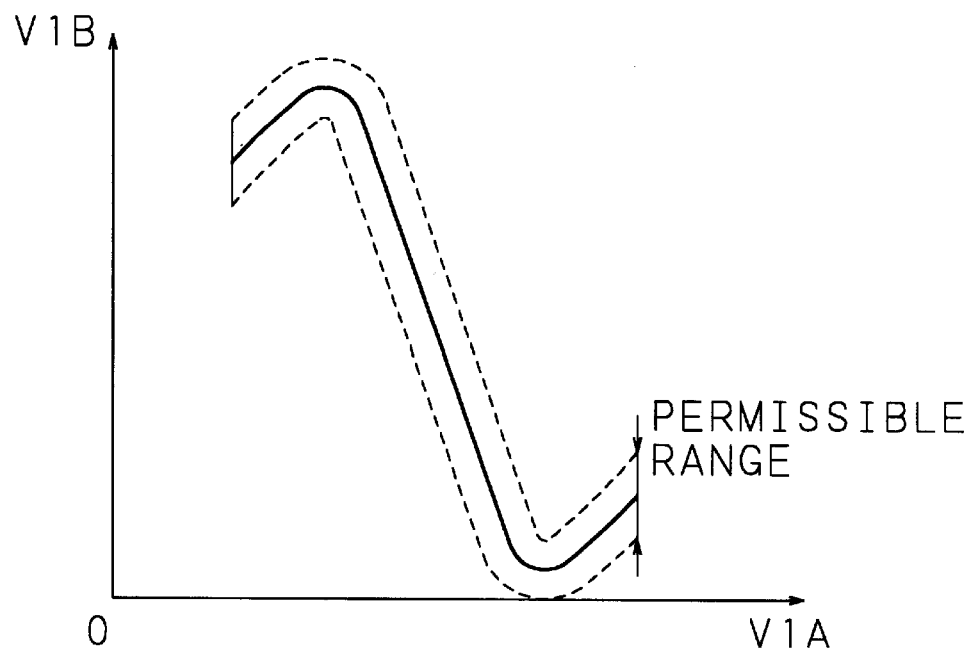
FIGS. 5A and 5B are graphs for illustrating an operation of a rotational angle detecting apparatus according to the present invention.

A reference diagram, by which one value of detected signal V1B is specified by one value of detected signal V1A, is obtained by limiting domains of the Lissajous' figure shown in FIG. 4 to where the detected signal VIA is in the linear domain in FIG. 3 and is selected for detecting the rotational angle, i.e. the torque. The reference diagram which shows a relation of each value of the detected signal V1A in the limited domain and each value of the detected signal V1B as described with the continuous line in FIG. 5A is stored in a memory 3 which is connected to a signal processing unit 11.

Figure 5B:
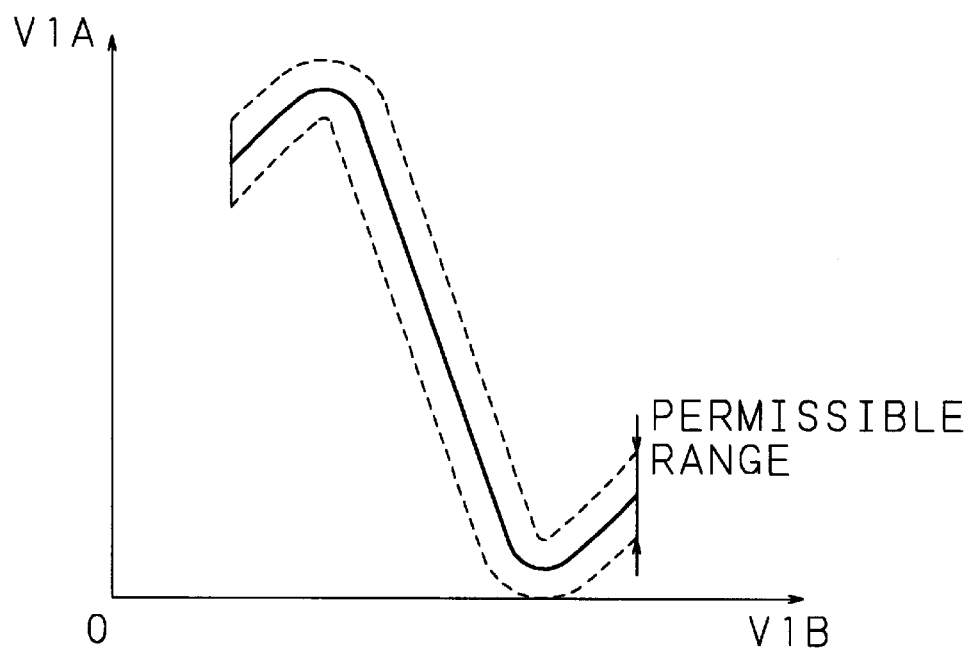

Likewise, a reference diagram which shows a relation of each value of the detected signal V1B in the limited domain and each value of the detected signal V1A as described with the continuous line in FIG. 5B is stored in a memory 3 which is connected to a signal processing unit 11.

Consequently, when the detected signal V1A is selected for detecting the rotational angle, i.e. a torque, it can be judged whether a value of the detected signal V1B (having a permissible range) stored in the memory 3, which corresponds to the detected signal V1A, is approximately the same as the value of the actual detected signal V1B. When the value of the detected signal V1B stored in the memory 3 is judged not to be approximately the same as the value of the actual detected signal V1B, it is judged that the sensor 1B malfunctions. Likewise, when the detected signal V1B is selected, it can be judged whether a value of the detected signal V1A (having a permissible range) store in the memory 3, which corresponds to the detected signal V1B, is approximately the same as the value of the actual detected signal V1A. When the value of the detected signal V1A stored in the memory 3 is judged not to be approximately the same as the value of the actual detected signal V1A, it is judged that the sensor 1A malfunctions.

The following description will explain an operation of the torque sensor constructed as described above.

In the torque sensor, every 36° the upper shaft 23 and the lower shaft 18 rotate, each part of the protruding object 7 and the protruding object 9 where is most adjacent to each detecting surface of the sensors 1A, 1B and the sensors 2A, 2B makes a return trip in axial direction of the upper shaft 23 and the lower shaft 18. The position in axial direction of the upper shaft 23 and the lower shaft 18 of each part of the protruding object 7 and the protruding object 9 where is most adjacent to each detecting surface of the sensors 1A, 1B and the sensors 2A, 2B corresponds to the rotational angle of the upper shaft 23 and the lower shaft 18.

Figure 6A:
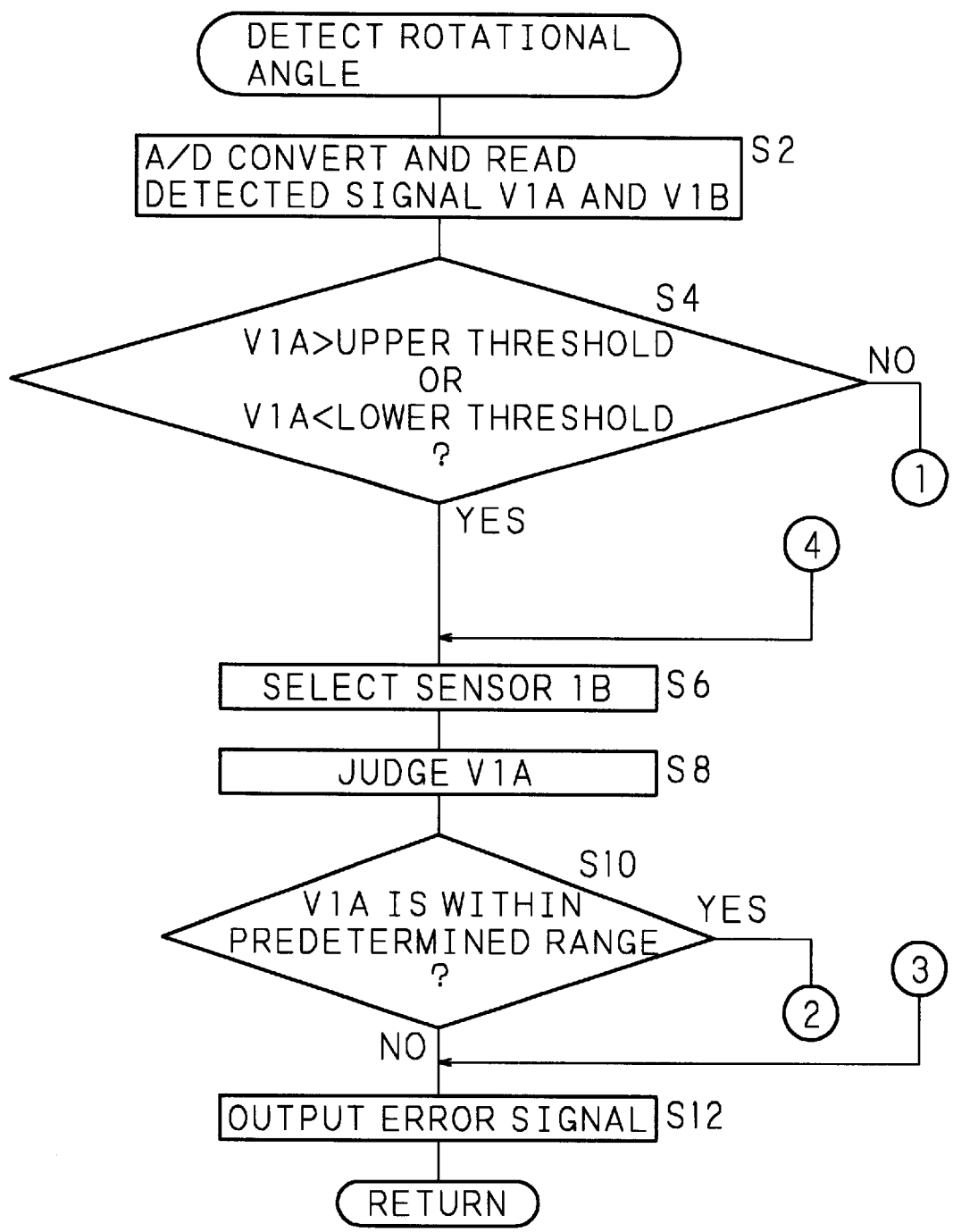
FIGS. 6A and 6B are flow charts showing an operation of a rotational angle detecting apparatus according to the present invention.
Figure 6B:
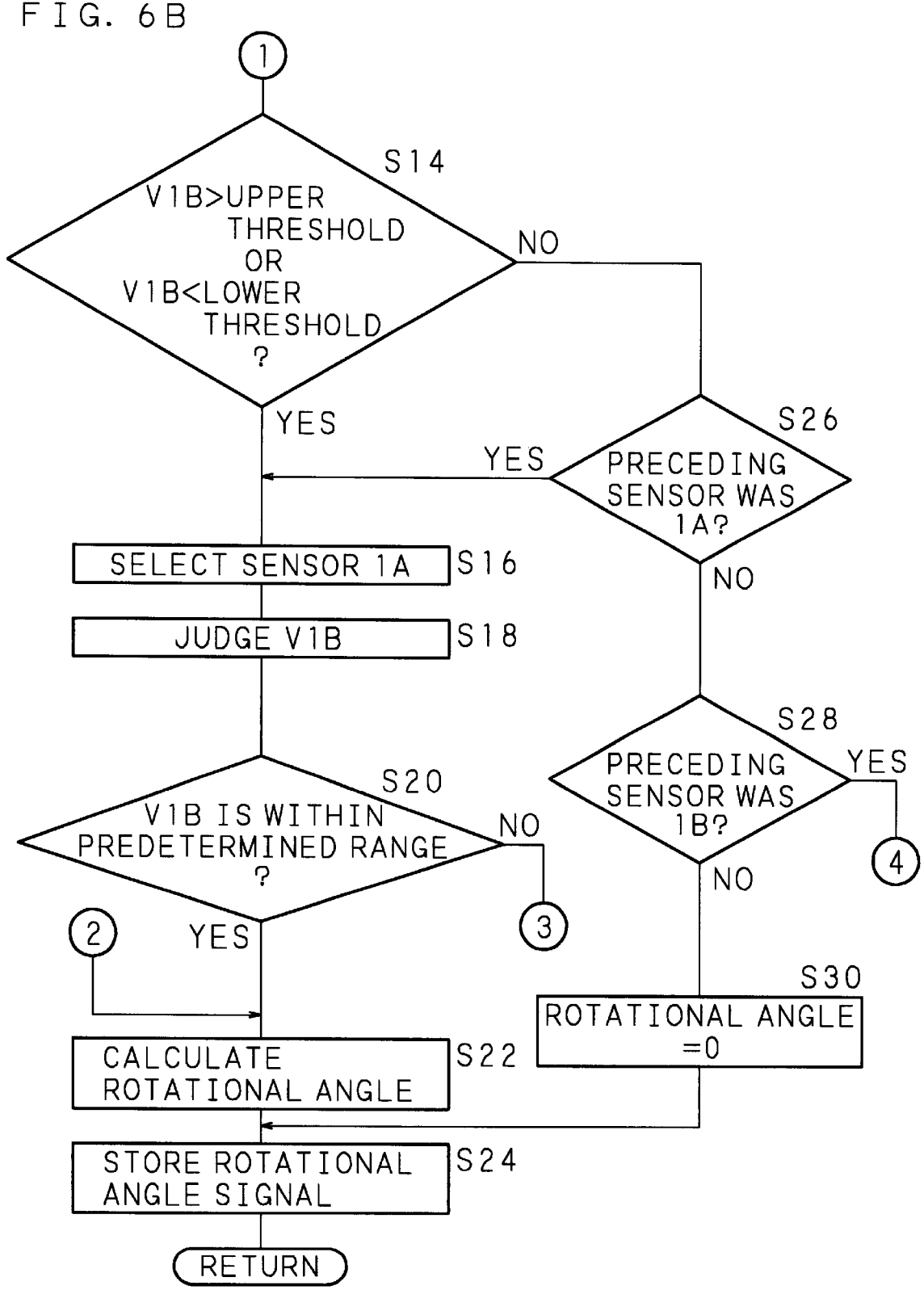

FIGS. 6A and 6B are flow charts showing a rotational angle detecting operation of a rotational angle detecting apparatus which is constructed from the torque sensor 1A, 1B and the signal processing unit 11.

Figure 7:
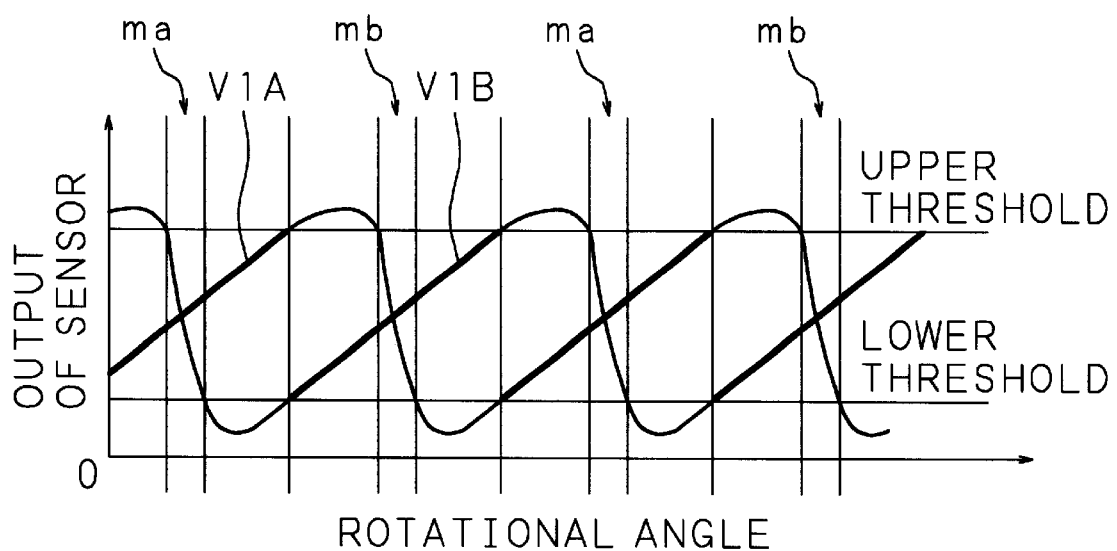
FIG. 7 is a graph for illustrating an operation of a rotational angle detecting apparatus according to the present invention.

The signal processing unit 11 A/D converts and reads the detected signals V1A and V1B from the sensors 1A and 1B (S2). The signal processing unit 11 judges whether the detected signal V1A is within a range between the upper threshold and the lower threshold (S4) and, when the detected signal V1A is not within the range, selects the sensor 1B (S6). On such an occasion, a linear domain of the detected signal V1B excluding "mb" region in a wave form chart of the detected signals V1A and V1B, which is shown in FIG. 7, is selected.

The signal processing unit 11 then judges whether the value of the detected signal V1A read in the step S2 is approximately the same as the value of the detected signal V1A corresponding to the value of the detected signal V1B of the sensor 1B in the reference diagram showing the relation which is described with the continuous line in FIG. 5B, the reference diagram being stored in the memory 3 (S8).

When the value of the detected signal V1A read in the step S2 is not within a range including the permissible range of the value of the detected signal V1A stored in the memory 3 (S10), the signal processing unit 11 outputs an error signal showing that the sensor 1A malfunctions (S12), and the procedure is returned. When the value of the detected signal V1A read in the step S2 is within a range including the permissible range of the value of the detected signal V1A stored in the memory 3 (S10), the signal processing unit 11 calculates the rotational angle of the upper shaft 23 based on the detected signal V1B (S22), and stores the calculated rotational signal (S24). The procedure is then returned.

The signal processing unit 11 judges whether the detected signal V1A is within a range between the upper threshold and the lower threshold (S4) and, when the detected signal V1A is within the range, judges whether the detected signal V1B is within a range between the upper threshold and the lower threshold (S14). When the detected signal V1B is not within the range between the upper threshold and the lower threshold, the signal processing unit 11 selects the sensor 1A (S16). On such an occasion, a linear domain of the detected signal V1A excluding "ma" region in a wave form chart of the detected signals V1A and V1B, which is shown in FIG. 7, is selected.

The signal processing unit 11 then judges whether the value of the detected signal V1B read in the step S2 is approximately the same as the value of the detected signal V1B corresponding to the value of the detected signal V1A of the sensor 1A in the reference diagram showing the relation which is described with the continuous line in FIG. 5A, the reference diagram being stored in the memory 3 (S18).

When the detected signal V1B read in the step S2 is not within a range including the permissible range of the detected signal V1B stored in the memory 3 (S20), the signal processing unit 11 outputs an error signal showing the malfunction of the sensor 1B (S12), and the procedure is returned (S24). When the detected signal V1B read in the step S2 is within the range including the permissible range of the detected signal V1B stored in the memory 3 (S20), the signal processing unit 11 calculates the rotational angle of the upper shaft 23 based on the detected signal V1A (S22), and stores the calculated rotational angle. The procedure is then returned (S24).

The signal processing unit 11 judges whether the detected signal V1B is within a range between the upper threshold and the lower threshold (S14) and, when the detected signal V1B is within the range, further judges whether the sensor 1A was selected at the preceding detection (S26). When the sensor 1A was selected at the preceding detection, the sensor 1A is selected again (S16).

The signal processing unit 11 judges whether the sensor 1A was selected at the preceding detection (S26) and, when the sensor 1A was not selected, further judges whether the sensor 1B was selected at the preceding detection (S28). When the sensor 1B was selected at the preceding detection, the sensor 1B is selected again (S6).

When the detected signal V1A is within a range between the upper threshold and the lower threshold (S4) and the detected signal V1B is within a range between the upper threshold and the lower threshold (S14), the rotational angle is in "ma" region or in "mb" region in FIG. 7. The "ma" region and the "mb" region are respectively center regions of the linear domains of the detected signal V1A and V1B. Since a value of the rotational angle never jumps from the linear domain of selected one detected signal to the linear domain of the other detected signal as it is obvious from the sampling period, the signal processing unit 11 selects the sensor which was employed at the preceding detection when the value of the rotational signal is in "ma" region and the "mb" region.

The signal processing unit 11 judges whether the sensor 1B was selected at the preceding detection (S28). When the sensor 1B was not selected at the preceding detection, it denotes that no sensor was selected at the preceding detection. It is at startup when no sensor was selected at the preceding detection and the detected signals V1A and V1B are both within the range between the upper threshold and the lower threshold. Consequently, the signal processing unit 11 sets zero for the rotational angle of the upper shaft 23 (S30) and stores the rotational angle (S24). The procedure is then returned.

Figure 8:
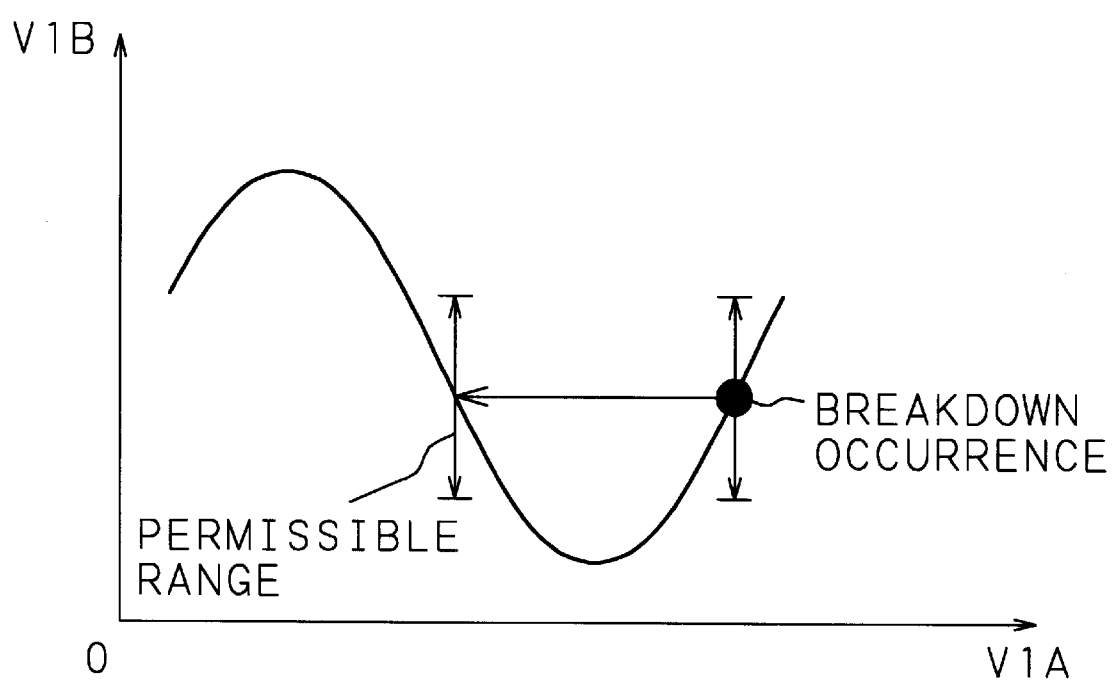
FIG. 8 is a graph for illustrating an operation of a rotational angle detecting apparatus according to the present invention.

After the signal processing unit 11 selects a sensor (S6, 16), the selected sensor may be broken and, moreover, the detected signal may be within the permissible range fortuitously as shown in FIG. 8. In that case, the malfunction cannot be detected immediately. However, since it is impossible that the detected signal stays within the permissible range when the upper shaft 23 rotates (conversely, if it is possible, the rotational signal detecting apparatus is not broken), the malfunction can be detected.

The operation for detecting the rotational angle of the lower shaft 18 of the rotational angle detecting apparatus, which is constructed from the sensors 2A, 2B and the signal processing unit 11, is the same as the above-mentioned operation for detecting the rotational angle of the upper shaft 23 of the rotational angle detecting apparatus constructed from the sensors 1A, 1B and the signal processing unit 11, and the explanation is omitted.

In the signal processing unit 11 storing a figure which includes a permissible range described with the dashed line in FIG. 4 besides Lissajous' figure described with the continuous line as a map in the memory 3 beforehand, malfunction of a sensor can be detected roughly but readily, by judging whether a pair of the detected signal V1A and V1B is included in the map.

When a steering torque is applied to the steering wheel 4 and the torsion bar 5 is twisted, angle difference equal to the torsion angle of the torsion bar 5 is generated between the detected angle of the rotational angle detecting apparatus constructed from the sensors 1A, 1B and the signal processing unit 11 and the detected angle of the rotational angle detecting apparatus constructed from the sensors 2A, 2B and the signal processing unit 11. Thus, the torsion angle of the torsion bar 5 is obtained by calculating the angle difference at the signal processing unit 11. The signal processing unit 11 outputs a torque signal expressing the steering torque.

In practice, the program for calculating each rotational angle of the upper shaft 23 and the lower shaft 18 is omitted. Malfunction of each of the sensors 1A, 1B, 2A, and 2B is detected by obtaining a steering torque directly from calculation between the detected signals V1A, V1B, V2A, and V2B.

Embodiment 2

Figure 9:
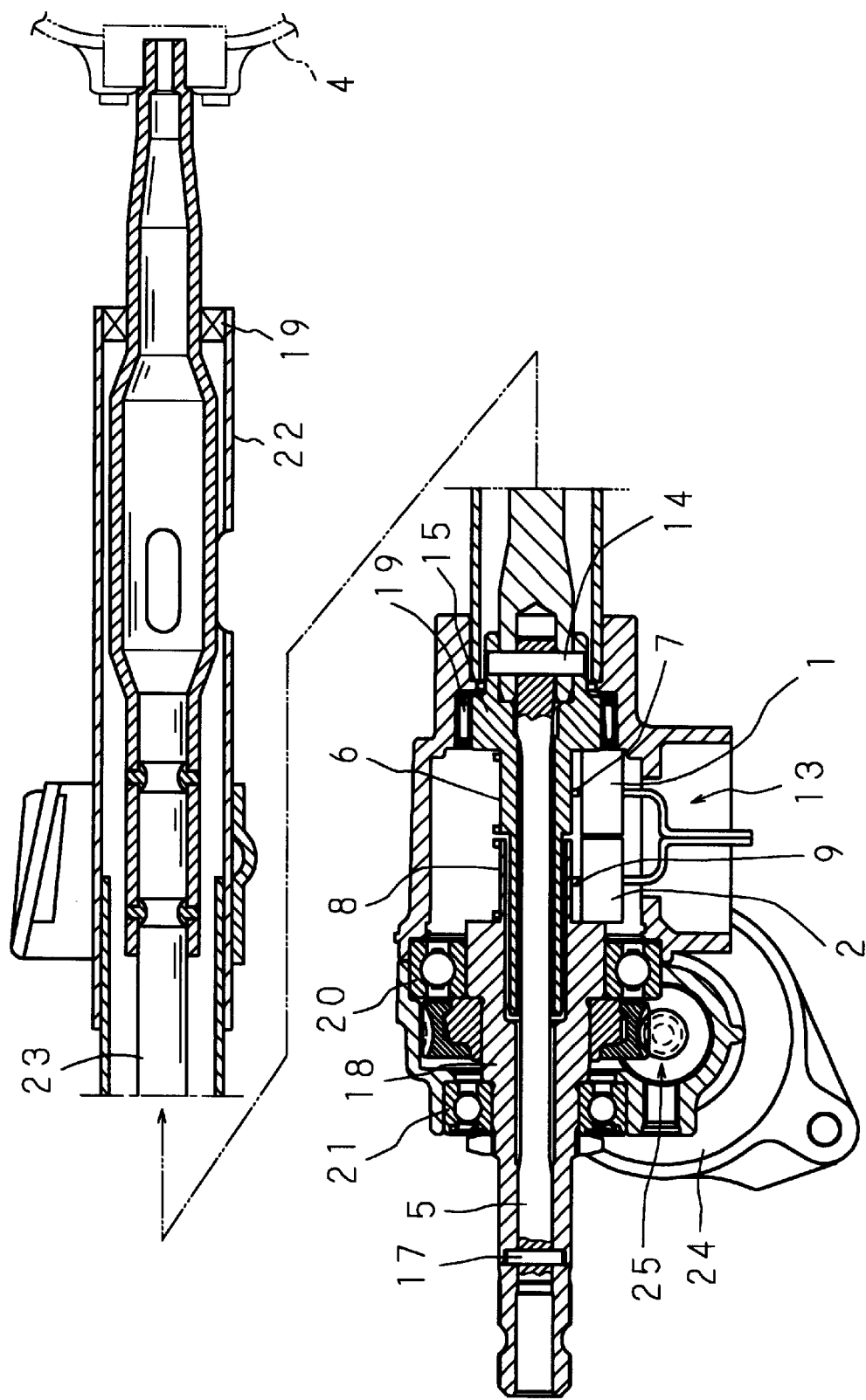
FIG. 9 is a longitudinal sectional view showing an essential structure of an Embodiment of a steering apparatus according to present invention.

FIG. 9 is a longitudinal sectional view showing an essential structure of Embodiment 2 of a steering apparatus according to present invention. The steering apparatus comprises an upper shaft 23, an upper end portion thereof being connected to the steering wheel 4. A lower end portion of the upper shaft 23 is connected to an upper end portion of a cylindrical input shaft 15 and a torsion bar 5 which is inserted into the interior of the input shaft 15, through a first dowel pin 14. A lower end portion of the torsion bar 5 is connected to a cylindrical output shaft 18 through a second dowel pin 17. The upper shaft 23, the input shaft 15, and an output shaft 18 are rotatably supported to the interior of a housing 22, respectively through bearings 19, 20, and 21.

The housing 22 comprises, at the interior thereof, a torque sensor 13 for detecting a steering torque based on a relative displacement of the input shaft 15 and the output shaft 18, which are connected to each other through the torsion bar 5, and a reduction mechanism 25 for reducing rotation of an electric motor for steering assistance 24 driven based on a result of detection of the torque sensor 13 and transferring the reduced rotation to the output shaft 18. The rotation of the electric motor 24 assists the operation of the steering mechanism in accordance with rotation of the steering wheel 4 and lightens driver' load for steering. A lower end portion of the output shaft 18 is connected to a rack-and-pinion type steering mechanism through a universal joint which is not shown in the figure.

The torque sensor 13 has a plurality of (FIG. 9 shows ten) protruding objects 7, 7 . . . (targets) made of magnetic material, with a predetermined tilt angle and along a circumferential surface of an intermediate portion 6 (a rotor) thereof. The protruding objects 7, 7 . . . are arranged to have a space therebetween. For detecting an adjacent part of the protruding object 7 moving in an axial direction of the input shaft 15 when the input shaft 15 rotates, a MR sensor 1 (a magneto-resistance effect element, detecting means) is fixed to an immovable portion of the automobile body, having an appropriate space with and being parallel to the input shaft 15.

The MR sensor 1 has two sensors which have 180° different electrical angles at the interior thereof. Detected signals showing the part of the protruding object 7, which are respectively detected by the two sensors, are given to a signal processing unit which is not shown in the figure.

The output shaft 18, similarly with the input shaft 15, has a plurality of (FIG. 9 shows ten) protruding objects 9, 9 . . . (targets) made of magnetic material, with a predetermined tilt angle and along a circumferential surface 8 (a rotor) thereof. The protruding objects 9, 9 . . . are arranged to have a space therebetween. For detecting an adjacent part of the protruding object 9 moving in an axial direction of the output shaft 18 when the output shaft 18 rotates, a MR sensor 2 (a magneto-resistance effect element, detecting means) is fixed to an immovable portion of the automobile body, having an appropriate space with and being parallel to the output shaft 18.

The MR sensor 2 has two sensors which have 180° different electrical angles at the interior thereof. Detected signals showing the part of the protruding object 7, which are respectively detected by the two sensors, are given to a signal processing unit which is not shown in the figure.

The following description will explain the operation of the steering apparatus constructed as mentioned above.

When the input shaft 15 and the output shaft 18 rotate without torsion of the torsion bar 5, the input shaft 15, the output shaft 18, and the torsion bar 5 rotate integrally.

Each part of the protruding objects 7 and 9, which is most adjacent to each detecting surface of each two sensors of MR sensors 1 and 2, moves in an axial direction of the input shaft 15 and the output shaft 18 in accordance with the rotation of the input shaft 15 and the output shaft 18. Since the protruding objects 7 and 9 are arranged to have a space therebetween with a predetermined tilt angle, the axial position of the input shaft 15 and the output shaft 18 of each part of the protruding objects 7 and 9, which is most adjacent to each detecting surface of each two sensors of MR sensors 1 and 2, corresponds to the rotational angle of the input shaft 15 and the output shaft 18.

When a steering torque is applied to the steering wheel 4 and the input shaft 15 and the output shaft 18 rotate with torsion of the torsion bar 5, voltage difference corresponding to the torsion angle of the torsion bar 5 arises between detected signals of each sensor of the MR sensors 1 and 2. The detected signals of each sensor of the MR sensors 1 and 2 are given to a signal processing unit which is not shown in the figure, through each output cables. As described in Embodiment 1, the signal processing unit of the torque sensor 13 selects detected signal of each sensor and outputs signals corresponding to a steering torque calculated from the selected detected signal.

The electric motor 24 is driven based on the signal outputted from the torque sensor 13. The electric motor 24 assists the operation of the steering mechanism in accordance with rotation of the steering wheel 4, and lightens drivers' load for steering.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotational angle detecting apparatus, comprising:
   a rotor;
   at least one target provided on the rotor for outputting a signal which repeats periodically in accordance with increases and decreases in rotation of the rotor;
   a first detector for detecting an adjacent part of the target;
   a second detector for detecting another part of the target which is a predetermined angle distant in a circumferential direction of the rotor from the part detected by the first detector;
   a memory for storing pairs of detected signal values which should be synchronously outputted from the first detector and the second detector;

means for detecting a rotational angle of the rotor based on the detected signal outputted from one of the first detector and the second detector;

judging means for determining whether a pair of detected signal values is within a predetermined range greater than or less than the pairs of detected signal values stored in the memory; and means for outputting a malfunction indicating signal when the judging means determines that the pair of detected signal values is not within the predetermined range.

2. A rotational angle detecting apparatus, comprising:

a rotor;

at least one target provided on the rotor for outputting a signal which repeats periodically in accordance with increases and decreases in accordance with rotation of the rotor;

a first detector for detecting an adjacent part of the target;

a second detector for detecting another part of the target which is a predetermined angle distant in a circumferential direction of the rotor from the part detected by the first detector;

a memory for storing, corresponding to a detected signal value which should be outputted from one of the first detector and the second detector, a detected signal value which should be synchronously outputted from the other detector;

means for detecting a rotational angle of the rotor based on the detected signal outputted from one of the first detector and the second detector;

selecting means for selecting one of the first detector and the second detector to detect the rotational angle of the rotor;

judging means for determining whether the detected signal value of the other detector, which the memory stores corresponding to the detected signal value outputted from the selected one of the detector selected by the selecting means, is within a predetermined range greater than or less than a detected signal value outputted from the other detector; and means for outputting a malfunction indicating signal when the judging means determines that the pair of detected signal values is not within the predetermined range.

3. A torque sensor, comprising the rotational angle detecting apparatus according to claim 1 respectively at an input shaft and an output shaft with the rotor thereof provided on the shaft, the input shaft and the output shaft being connected through a torsion bar, wherein a torque applied to the input shaft is detected based on difference of rotational angles detected by the rotational angle detecting apparatus, generated with torsion of the torsion bar.

4. A torque sensor, comprising the rotational angle detecting apparatus according to claim 2 respectively at an input shaft and an output shaft, the input shaft and the output shaft being connected through a torsion bar, wherein a torque applied to the input shaft is detected based on difference of rotational angles detected by the rotational angle detecting apparatus, generated with torsion of the torsion bar.

5. A steering apparatus, comprising:

an input shaft connected to a steering wheel;

an electric motor for steering assistance, driven and controlled based on a steering torque applied to the steering wheel;

an output shaft connected to a steering mechanism and interlocks with the electric motor;

a torsion bar connecting the input shaft and the output shaft; and a torque sensor according to claim 3 for detecting a steering torque applied to the input shaft, wherein the electric motor assists steering based on the steering torque detected by the torque sensor.

6. A steering apparatus, comprising:

an input shaft connected to a steering wheel;

an electric motor for steering assistance, driven and controlled based on a steering torque applied to the steering wheel;

an output shaft connected to a steering mechanism and interlocks with the electric motor;

a torsion bar connecting the input shaft and the output shaft; and a torque sensor according to claim 4 for detecting a steering torque applied to the input shaft, wherein the electric motor assists steering based on the steering torque detected by the torque sensor.

7. A rotational angle detecting apparatus, comprising:

a rotor;

at least one target provided on the rotor for outputting a signal which repeats periodically in accordance with increases and decreases in rotation of the rotor;

a first detector for detecting an adjacent part of the target;

a second detector for detecting another part of the target which is a predetermined angle distant in a circumferential direction of the rotor from the part detected by the first detector;

a memory for storing pairs of detected signal values which should be synchronously outputted from the first detector and the second detector; and a signal processing unit, performing the following operations:

(i) detecting a rotational angle of the rotor based on the detected signal outputted from one of the first detector and the second detector;

(ii) determining whether a pair of detected signal values is within a predetermined range greater than or less than the pairs of detected signal values stored in the memory; and (iii) outputting a malfunction indicating signal when it is determined that the pair of detected signal values is not within the predetermined range.

8. A rotational angle detecting apparatus, comprising:

a rotor;

at least one target provided on the rotor for outputting a signal which repeats periodically in accordance with increases and decreases in accordance with rotation of the rotor;

a first detector for detecting an adjacent part of the target;

a second detector for detecting another part of the target which is a predetermined angle distant in a circumferential direction of the rotor from the part detected by the first detector;

a memory for storing, corresponding to a detected signal value which should be outputted from one of the first detector and the second detector, a detected signal value which should be synchronously outputted from the other detector;

a signal processing unit, performing the following operations:
- (i) detecting a rotational angle of the rotor based on the detected signal outputted from one of the first detector and the second detector;
- (ii) selecting one of the first detector and the second detector to detect the rotational angle of the rotor;
- (iii) determining whether the detected signal value of the other detector, which the memory stores corresponding to the detected signal value outputted from the selected one of the detector, is within a predetermined range greater than or less than a detected signal value outputted from the other detector; and
- (iv) outputting a malfunction indicating signal when the judging means determines that the pair of detected signal values is not within the predetermined range.

9. A torque sensor, comprising the rotational angle detecting apparatus according to claim 7 respectively at an input shaft and an output shaft with the rotor thereof provided on the shaft, the input shaft and the output shaft being connected through a torsion bar, wherein a torque applied to the input shaft is detected based on difference of rotational angles detected by the rotational angle detecting apparatus, generated with torsion of the torsion bar.

10. A torque sensor, comprising the rotational angle detecting apparatus according to claim 8 respectively at an input shaft and an output shaft, the input shaft and the output shaft being connected through a torsion bar, wherein a torque applied to the input shaft is detected based on difference of rotational angles detected by the rotational angle detecting apparatus, generated with torsion of the torsion bar.

11. A steering apparatus, comprising:

an input shaft connected to a steering wheel;

an electric motor for steering assistance, driven and controlled based on a steering torque applied to the steering wheel;

an output shaft connected to a steering mechanism and interlocks with the electric motor;

a torsion bar connecting the input shaft and the output shaft; and a torque sensor according to claim 9 for detecting a steering torque applied to the input shaft, wherein the electric motor assists steering based on the steering torque detected by the torque sensor.

12. A steering apparatus, comprising:

an input shaft connected to a steering wheel;

an electric motor for steering assistance, driven and controlled based on a steering torque applied to the steering wheel;

an output shaft connected to a steering mechanism and interlocks with the electric motor;

a torsion bar connecting the input shaft and the output shaft; and a torque sensor according to claim 10 for detecting a steering torque applied to the input shaft, wherein the electric motor assists steering based on the steering torque detected by the torque sensor.

* * * * *